United States Patent
Pincemin et al.

(10) Patent No.: US 9,838,115 B2
(45) Date of Patent: Dec. 5, 2017

(54) DETERMINATION OF AN OPTICAL SIGNAL TO NOISE RATIO OF A DUAL-POLARIZATION OPTICAL SIGNAL

(71) Applicant: Orange, Paris (FR)

(72) Inventors: Erwan Pincemin, Gommenec'h (FR); Yann Loussouarn, Lannion (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 14/904,354

(22) PCT Filed: Jul. 9, 2014

(86) PCT No.: PCT/FR2014/051767
§ 371 (c)(1),
(2) Date: Jan. 11, 2016

(87) PCT Pub. No.: WO2015/004390
PCT Pub. Date: Jan. 15, 2015

(65) Prior Publication Data
US 2016/0142134 A1    May 19, 2016

(30) Foreign Application Priority Data
Jul. 10, 2013 (FR) ..................... 13 56783

(51) Int. Cl.
*H04B 10/08* (2006.01)
*H04B 10/079* (2013.01)
*H04B 10/077* (2013.01)

(52) U.S. Cl.
CPC ... *H04B 10/07953* (2013.01); *H04B 10/0775* (2013.01); *H04B 2210/074* (2013.01)

(58) Field of Classification Search
CPC .......... H04B 10/07953; H04B 10/0775; H04B 2210/074; H04B 10/5561; H04B 10/532;
(Continued)

(56) References Cited

U.S. PATENT DOCUMENTS 6,433,864 B1 * 8/2002 Chung ................. H04B 10/077
356/73.1
7,643,761 B2 * 1/2010 Moeller ............... H04B 10/695
398/155
(Continued)

FOREIGN PATENT DOCUMENTS

| EP | 2264916 A1 | 12/2010 |
|---|---|---|
| WO | 2008122123 A1 | 10/2008 |
| WO | 2011097734 A1 | 8/2011 |

OTHER PUBLICATIONS

International Search Report and Written Opinion dated Aug. 29, 2014 for corresponding International Application No. PCT/FR2014/051767, filed Jul. 9, 2014.
(Continued)

*Primary Examiner* — Hibret Woldekidan
(74) *Attorney, Agent, or Firm* — David D. Brush; Westman, Champlin & Koehler, P.A.

(57) ABSTRACT

A method is provided for determining an optical signal to noise ratio of a dual polarization optical signal. The method includes: detecting, in the dual polarization optical signal, a modulation signal which modulates, at at least one low amplitude level that is approximately zero and at a high amplitude level, the dual polarization optical signal, and determining the optical signal to noise ratio from a measurement of the power of the modulation signal.

8 Claims, 3 Drawing Sheets

Figure 1:
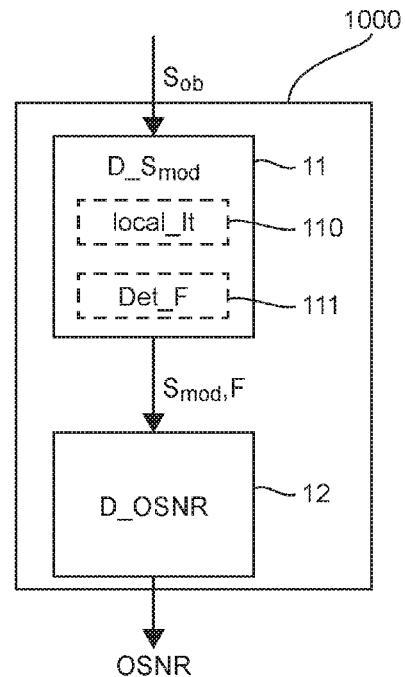

(58) Field of Classification Search
CPC .. H04B 10/541; H04B 10/67; H04B 10/2572; H04B 10/0795; H04B 10/60; H04B 10/077; H04B 10/07955; H04B 10/079; H04B 2210/07; H04J 14/06; H04Q 2011/0083; H04L 27/02; G02F 1/0136
USPC ................ 398/25, 26, 186, 205, 35, 38
See application file for complete search history.

(56) References Cited

U.S. PATENT DOCUMENTS

| | | | | |
|---|---|---|---|---|
| 8,989,571 | B2* | 3/2015 | Kim | H04B 10/0773 398/183 |
| 9,413,455 | B2* | 8/2016 | Oda | H04B 10/07953 |
| 2010/0067923 | A1* | 3/2010 | Arahira | G02F 1/3519 398/188 |
| 2010/0322622 | A1* | 12/2010 | Shukunami | H04B 10/07953 398/26 |
| 2011/0274441 | A1* | 11/2011 | Djupsjobacka | H04B 10/5051 398/184 |
| 2012/0063772 | A1* | 3/2012 | Dahan | H04B 10/07953 398/26 |
| 2014/0369679 | A1* | 12/2014 | Vassilieva | H04B 10/2572 398/26 |
| 2015/0010299 | A1* | 1/2015 | Wei | H04B 10/07953 398/26 |
| 2015/0341121 | A1* | 11/2015 | Yue | H04B 10/532 398/184 |
| 2016/0056891 | A1* | 2/2016 | Chen | H04B 10/07953 398/26 |
| 2016/0142133 | A1* | 5/2016 | Chitgarha | H04J 14/0227 398/26 |

OTHER PUBLICATIONS

English Translation of the Written Opinion for International Application No. PCT/FR2014/051767 filed Jul. 9, 2014, dated Aug. 29, 2014.

Daniel Gariepy et al., "Novel OSA-Based Method for In-Band OSNR Measurement", Optical Fiber Communication (OFC), Collocated National Fiber Optic Engineers Conference, 2010 Conference on (OFC/NFOEC), IEEE, Piscataway, NJ, USA, Mar. 21, 2010 (Mar. 21, 2010), pp. 1-3, XP031677268.

* cited by examiner

DETERMINATION OF AN OPTICAL SIGNAL TO NOISE RATIO OF A DUAL-POLARIZATION OPTICAL SIGNAL

CROSS-REFERENCE TO RELATED APPLICATIONS

This Application is a Section 371 National Stage Application of International Application No. PCT/FR2014/051767, filed Jul. 9, 2014, which is incorporated by reference in its entirety and published as WO 2015/004390 A1 on Jan. 15, 2015, not in English.

1. FIELD OF THE INVENTION

The field of the invention is that of optical communications and more specifically that of the measurement of the optical signal-to-noise ratio (OSNR) of optical signals, especially coherent dual-polarized optical signals, in order to evaluate the quality of transmission between transmission and reception.

The invention can be applied especially in optical transmission systems implementing wavelength division multiplexing or WDM, using a dual-polarized modulation, for example quadrature phase shift keying (QPSK) or also 16-state quadrature amplitude modulation (16QAM).

2. PRIOR ART

In WDM transmission systems, the phase noise introduced by the lasers (emitting lasers and local oscillator) and by the transmission line (noise related to amplified spontaneous emission or ASE and non-linear effects) is great. In order to evaluate this noise, it is the usual practice to measure the optical signal-to-noise ratio.

For classic transmission systems, the determining of the optical signal-to-noise ratio or OSNR in in-band mode has become very popular in recent years because, as compared with the off-band mode, the OSNR of the observed channel can be known without having to suspend on-going transmission on this channel (to perceive the ASE noise associated with the observed channel) and without having to stop on-going transmissions in the immediately neighboring channels of the observed channel (to perceive the ASE noise which is situated on either side of the observed channel). These techniques for measuring the OSNR associated with the classic transmission systems are unfortunately not suited to a WDM transmission system when it is in service as they would mean interrupting these transmissions.

One method for measuring the in-band OSNR of a single-polarized optical channel implemented in the WDM system was proposed some years ago to prevent the stopping of ongoing transmission on the channel to be observed or again to prevent the suspension of the ongoing transmission or transmissions on channels neighboring the channel to be observed.

More specifically, this method relies on the duality existing between the polarization of the single-polarized WDM channel and the ASE noise that has accumulated in the chain or sequence of optical amplifiers. Indeed, the ASE noise that has collected in the chain of optical amplifiers is by its nature depolarized. In other words all the polarization states of the Poincaré sphere are also represented in terms of power in the ASE noise.

In this method, it is assumed that the optical channel received, after transmission in the optical channel, has linear polarization on arrival at the in-band OSNR determining device that could be connected to a reception device. As a preliminary, this method implements a filtering of the signal to be measured, filtering both the source signal and the ASE noise.

Thus, by placing a polarizer whose axis is aligned on the polarization of the signal to be measured, it is possible to measure the power of the signal $P_S$ and half of the power of the ASE noise $P_{ASE}$ (i.e. the contribution of the ASE noise which is situated in the measured signal). The term $P_X$ denotes this power measured on the polarization axis X.

Then, the axis of the polarizer is modified by 90° relative to the axis of the signal aligned with the polarization axis X in order to measure the other half of the contribution of the ASE noise (i.e. the contribution of the ASE noise orthogonal to the polarization of the signal, and situated beneath the signal). $P_Y$ denotes this power measured on the polarization axis Y (corresponding to the axis forming an angle of 90° with the polarization axis X).

Once these two measurements have been made, the in-band OSNR (i.e. the OSNR of the measured channel) is determined by means of the following expression:

$$OSNR = \frac{P_S}{P_{ASE}} = \frac{P_X - P_Y}{2P_Y}$$

Unfortunately, this method can be used to isolate the ASE noise only for a single-polarization signal, and is not applicable to other types of optical signals. It is especially inapplicable for measuring the in-band OSNR of a dual-polarized optical signal, such as those used today, for example in coherent WDM transmission systems at 40 Gbps and 100 Gbps. Today, there are no existing efficient measurement methods that could apply to signals of this type. There is therefore a need for a novel technique for determining optical signal-to-noise ratio that performs well and is simple to implement, especially for dual-polarized signals.

In addition, in order to use a same module for determining the optical signal-to-noise ratio for an optical signal independently of the type of polarization implemented, the proposed technique for determining the optical signal-to-noise ratio must be compatible with a single-polarized optical signal, dual-polarized optical signal or again another type of multiple polarized signal.

3. SUMMARY OF THE INVENTION

The invention proposes a novel solution that does not have the drawbacks of the prior art, in the form of a method for determining an optical signal-to-noise ratio of a dual-polarized optical signal.

According to the invention, such a method comprises the following steps:
  detecting, in said dual-polarized optical signal, a modulation signal modulating said dual-polarized optical signal, on at least one lower level of amplitude that is substantially zero and a higher level of amplitude, and determining said optical signal-to-noise ratio on the basis of a measurement of power of said modulation signal.

It is thus possible, for an optical signal, to determine the signal-to-noise ratio associated with the noise alone related to the amplified spontaneous emission (ASE) without this measurement being influenced by other noises such as the one caused by non-linear effects in the transmission fiber. The determining of a signal-to-noise ratio of this kind, as a function only of the noise related to the amplified spontaneous emission (ASE), is decisive especially to qualify WDM systems during their deployment. The invention therefore makes it possible to dissociate the noise related to amplified spontaneous emission (ASE) from the noise resulting from non-linear effects.

In addition, this technique is particularly suited to determining the optical signal-to-noise ratio for a dual-polarized optical signal. Indeed, the technique of the invention can rely on the use of a modulation signal for modulating the dual-polarized optical signal having at least two detectable levels of amplitude. In other words, the invention extracts a modulation signal from the dual-polarized optical signal received after it has been transmitted in an optical transmission line.

Once the distinct amplitude levels of the modulation signal have been detected, one amplitude level being substantially zero, the invention carries out a measurement of power of this modulation signal and not that of the dual-polarized optical signal received in its totality. Indeed, the modulation signal is affected in the same way as the received dual-polarized optical signal by the noise introduced by the optical transmission line especially. Thus, measuring power only from the modulation signal contained in the received dual-polarized optical signal amounts to quantifying the noise introduced during transmission.

As compared with the dual-polarized optical signal received after transmission, the advantage of using the modulation signal presenting at least two levels of amplitude is that it facilitates the measurement of power because it does not show dual polarization. Thus, a high precision of measurement is obtained in order to then set up a reliable optical signal-to-noise ratio.

Besides, the proposed technique is simple to implement and costs little in terms of computation power. Indeed, this technique requires only a detection of the modulation signal of the optical signal. Such a detection is simple to implement because it is based on the detection of the at least two levels of amplitude of the modulation signal.

For example, such a modulation signal is a signal represented by a square-wave function having at least two levels of amplitude. Among the square-wave functions, the periodic "gate" function having two levels of amplitude is for example used according to the invention. The signals having this type of "gate" function are for example the NRZ-OOK signals delivered by a Mach-Zehnder modulator (MZM) or an acousto-optical modulator (AOM) with a response independent of the polarization of the incoming signal. Modulation signals of this type, based on a periodic square-wave function, cost little and are relatively simple to implement.

The invention is advantageously implemented in in-band mode. This makes it possible, as compared with the off-band mode, to know the OSNR of the observed channel without any need to suspend the ongoing transmission on this channel (to perceive the ASE noise associated with the observed channel) and without any need to stop ongoing transmission on the immediately neighboring channels of the observed channel (to perceive the ASE noise situated on either side of the observed channel).

In addition, according to another alternative, it is clear that the method according to the invention can be implemented in off-band mode.

According to one particular embodiment, the step for detecting comprises a step for localizing a time slot dedicated to a modulation on said levels of amplitude of the optical signal by said modulation signal.

Thus, the modulation signal can be easily detected because it is localized on a dedicated time slot devoid of payload data.

The localizing of this interval is for example predetermined and known to the module for determining an optical signal-to-noise ratio of an optical signal.

According to another alternative, a piece of information for localizing this slot is received by the determining module.

The duration of the time slot is for example at least equal to 500 microseconds. In addition, this time slot is for example located temporally every five to 15 minutes within the optical signal. In other words, according to one particular example of implementation, it is possible to detect the modulation signal according to the invention every five minutes on a duration of 500 microseconds, the optical signal having no payload data in this duration.

According to one particular aspect of this embodiment, the steps for detecting the modulation signal and for determining the optical signal-to-noise ratio are implemented on a median time zone, called a second time zone, of said time slot.

Since the steps of detection and modulation are implemented on a median time zone, called a second time zone, of the time slot, it is ensured on this median zone that no payload data of the optical signal will be present. This averts any loss of information during the steps of detection and modulation.

According to one particular embodiment of the invention, the step for detecting comprises a step for detecting a frequency of the modulation signal and the step for determining said optical signal-to-noise ratio comprises the following steps:

generating a reference signal, having at least one lower level of amplitude that is substantially zero and a higher level of amplitude, the frequency of this reference signal being equal to said detected frequency;

temporally shifting the reference signal relative to the modulation signal so that the higher level of amplitude of the reference signal is synchronized with the lower level of the modulation signal, delivering a lower reference signal, modulating said modulation signal by means of said lower reference signal, delivering a first superimposed signal associated with a lower level of said modulation signal, measuring the power of said superimposed first signal delivering a first power value $P_0$, temporally shifting said reference signal relative to said modulation signal so that the higher level of amplitude of said reference signal is synchronized with the higher level of said modulation signal, delivering a higher reference signal, modulating said modulation signal by means of said higher reference signal, delivering a second superimposed signal associated with the higher level of said modulation signal, measuring the power of said second superimposed signal, delivering a second power value $P_1$, obtaining said signal optical signal-to-noise ratio from said first and second power values $P_0$ and $P_1$.

Thus, the optical signal-to-noise ratio of an optical signal is obtained according to this particular embodiment of the invention by application of two measurements of power with a superimposed signal corresponding to a superimposition of the signal of modulation of the received optical signal comprising a noisy contribution and a noiseless reference signal.

In other words, according to the invention, the optical signal-to-noise ratio of an optical signal is received in the following form:

$$OSNR = \frac{P_S}{P_{ASE}} = \frac{P_1 - P_0}{P_0}$$

The first power measurement is made when the superimposed signal is such that a higher level of amplitude of the reference signal is synchronized with a lower level of said modulation signal. The power value $P_0$ corresponds in this case to the power of the noise alone. The second measurement of power is made when the superimposed signal is such that a higher level of amplitude of the reference signal is synchronized with a higher level of said modulation signal, the power value $P_1$ corresponding in this case to the power of the optical signal sent and that of the noise.

Thus, a simple and precise determining of the optical signal-to-noise ratio of an optical signal is implemented according to the invention.

Besides, it must be noted that, optionally, the step for generating the reference signal is followed by a step for amplifying this reference signal.

In addition, according to another option, which can or cannot be combined with the step of amplification here above, a step of optical filtering is preliminarily implemented to select an optical channel on which the optical signal has been transmitted.

In addition, according to one particular feature of this embodiment, the steps of modulation implement a modification of the duty cycle of the reference signal so that it is half as small as that of the modulation signal.

For example, when the reference signal and the modulation signal before sending, (in other words they are not noisy as a result of transmission) have the periodic "gate" function shape and have two levels of amplitude, the duration of the lower level of amplitude of the reference signal is twice as long as that of the higher level of amplitude, while these two durations are equal for the modulation signal.

This modification of the duty cycle of the reference signal relative to the modulation signal ensures efficient measurement of the power of the first and second power values $P_0$ and $P_1$.

Indeed, the first and second power values measured are measured without being disturbed by the transitions between said at least two levels of amplitude of the reference signal and of the modulation signal detected in the optical signal received.

According to another particular aspect of the invention, the detected frequency of the modulation signal is of the order of 1 MHz.

Indeed, as compared with the WDM transmission systems at 40 Gbps and 100 Gbps, a frequency of the order of 1 MHz prevents the modulation signal from being affected by chromatic dispersion accumulated in the optical transmission line used to transmit the optical signal according to the invention.

In another embodiment, the invention pertains to a method for transmitting a dual-polarized optical signal comprising the following steps:

generating said dual-polarized optical signal, said signal comprising at least one time slot dedicated to a modulation by a modulation signal, of said optical signal on at least one lower level of amplitude that is substantially zero and a higher level of amplitude, modulating, on said at least one time slot, said dual-polarized optical signal by said modulation signal, delivering a modified optical signal, and transmitting said modified optical signal in an optical transmission line.

Thus, in a manner reciprocal to the method for determining an optical signal-to-noise ratio according to the invention, the method of transmission implements a modulation on at least two levels of amplitude of the optical signal by a modulation signal.

Reciprocally, the method for transmitting a dual-polarized optical signal according to the invention is also implemented according to the different variants of embodiments of the method described here above for determining an optical signal-to-noise ratio.

More specifically, according to one example, the modulation signal is a signal represented by a square-wave function having at least two levels of amplitude.

Among the square-wave functions, the periodic "gate" function having two levels of amplitude is for example used according to the invention. The signals having this type of "gate" function are for example the NRZ-OOK signals delivered by a Mach-Zehnder (MZM) or an acousto-optical modulator (AOM), the response of which is independent of the polarization of the incoming signals.

Besides, the frequency of the modulation signals used in transmission is for example of the order of 1 MHz.

Indeed, as compared with WDM systems of transmission at 40 Gbps and 100 Gbps, a frequency of the order of 1 MHz prevents the modulation signal from being affected by a chromatic dispersion accumulated in the optical transmission line used to transmit, for example, a dual-polarized optical signal according to the invention.

For other bit rate values of transmission systems, it is therefore preferable to use a very low frequency modulation signal as compared with the optical bit rate of transmission, this frequency being, for example, at least 40,000 time lower than the bit rate value used.

The duration of the time slot generated by the method for transmitting according to the invention is for example equal to at least 500 microseconds. In addition, this time slot is for example temporally localized every five to 15 minutes within the optical signal.

The invention also pertains to a dual-polarized optical signal comprising at least one time slot dedicated to a modulation, by a modulation signal, of the optical signal on at least one lower level of amplitude that is substantially zero and on a higher level of amplitude.

According to one particular aspect of this signal, said at least one time slot comprises at least three successive and distinct time zones:

a first time zone comprising a piece of information reporting the end of transmission of a part of payload data localized in said optical signal before said time slot, said first zone enabling a synchronization of a reception device on a synchronization mode internal to said reception device, a second time zone on which said optical signal is modulated by a modulation signal on said levels of amplitude, a third time zone comprising a piece of learning information enabling a change in mode of synchronization of said reception device in order to pass from said internal synchronization mode towards a mode of synchronization associated with a part of payload data localized in said optical signal after said time slot.

For example, for a time slot with a duration equal to 500 microseconds, 25% of this duration corresponds to the first time zone, 50% corresponds to the second time zone and the last 25% corresponds to the third time zone.

The invention also pertains to a method for receiving a dual-polarized optical signal comprising the following steps:
- receiving said dual-polarized optical signal, and
- determining an optical signal-to-noise ratio of said dual-polarized optical signal received as described here above.

The method for receiving an optical signal according to the invention is also implemented according to the different alternative embodiments of the method for determining an optical signal-to-noise ratio described here above.

According to one particular aspect of the method for receiving according to the invention, the method for receiving comprises a step for localizing a time slot dedicated to a modulation, by a modulation signal, of said optical signal on at least one lower level of amplitude that is substantially zero and a higher level of amplitude of said optical signal, said time slot comprising at least three successive and distinct time zones.

In addition, said method of reception comprises the following successive steps, implemented by a reception device:
- on a first time zone of said time slot, first synchronization of said reception device on a mode of synchronization internal to said reception device,
- on a second time zone of said time slot, said steps for detecting and determining said optical signal-to-noise ratio,
- on a third time zone of said time slot, second synchronization of said reception device in using a mode of synchronization associated with a part of payload data localized in said optical signal received after said time slot.

Thus, the method of reception manages the presence of a time slot devoid of payload data in adapting the mode of synchronization of reception.

In yet another embodiment, the invention pertains to one or more computer programs comprising instructions for implementing a method for determining an optical signal-to-noise ratio and/or instructions to implement the method for transmitting and/or instructions to implement the method for receiving as described here above, when this program or these programs are executed by a processor.

The methods of the invention can therefore be implemented in various ways, for example in wired form or in software form.

The invention also pertains to a computer-readable information carrier comprising instructions of a computer program as mentioned here above.

In another embodiment, the invention pertains to a module for determining an optical signal-to-noise ratio of a dual-polarized optical signal. According to the invention, such a module comprises:
- a detector detecting, in said dual-polarized optical signal, a modulation signal modulating said dual-polarized optical signal on at least one lower level of amplitude that is substantially zero and a higher level of amplitude,
- a unit for determining said optical signal-to-noise ratio on the basis of a measurement of power of said modulation signal.

Such a module for determining an optical signal-to-noise ratio is especially adapted to implementing the method for determining an optical signal-to-noise ratio described here above. It is for example capable of being connected/disconnected to and from a device for receiving optical signals.

This module for determining an optical signal-to-noise ratio could of course comprise the different characteristics of the method for determining an optical signal-to-noise ratio described here above which can be combined or taken in isolation. Thus, the characteristics and advantages of this module are the same as those of the method for determining an optical signal-to-noise ratio. They are therefore not described in greater detail.

Advantageously, such a module for determining this optical signal-to-noise ratio is compatible with determining an optical signal-to-noise ratio of a single-polarized optical signal, dual-polarized optical signal or multiple-polarized optical signal.

In another embodiment, the invention pertains to a device for transmitting a dual-polarized optical signal. According to the invention, such a device comprises:
- a generator of said dual-polarized optical signal, said dual-polarized optical signal comprising at least one time slot dedicated to a modulation, by a modulation signal, of said dual-polarized optical signal on at least one lower level of amplitude that is substantially zero and a higher level of amplitude,
- a modulator, during said at least one time slot, for modulating said optical signal by said modulation signal, delivering a modified optical signal,
- a unit for transmitting said modified optical signal in an optical transmission line.

Such a device for transmitting (or transmission device) is especially adapted to implementing the method of transmission described here above. This transmission device could of course comprise the different characteristics of the method of transmission described here above which can be combined or taken in isolation. Thus, the characteristics and advantages of this transmission device are the same as those of the method of transmission. They are therefore not described in more ample detail.

In another embodiment, the invention pertains to a device for receiving a dual-polarized optical signal. According to the invention, the device comprises:
- a unit for receiving said dual-polarized optical signal,
- a module for determining an optical signal-to-noise ratio of said received dual-polarized optical signal described here above.

Such a device for receiving is especially suited to implementing the method of receiving described here above. This reception device could of course comprise the different characteristics of the method for receiving described here above, which can be combined or taken in isolation. Thus, the characteristics and advantages of this reception device are the same as those of the method for receiving. As a consequence, they are not described in greater detail.

4. LIST OF FIGURES

Figure 2:
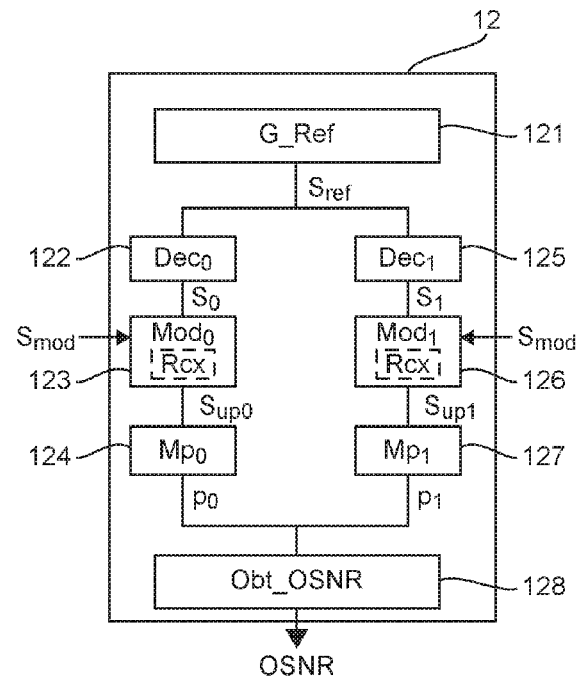
Figure 3:
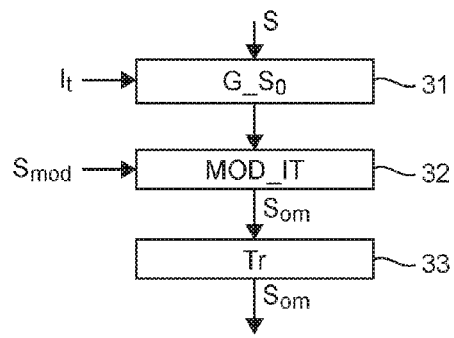
Figure 4:
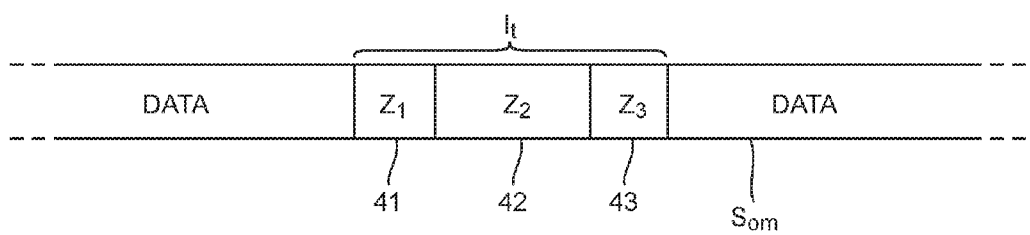
Figure 5:
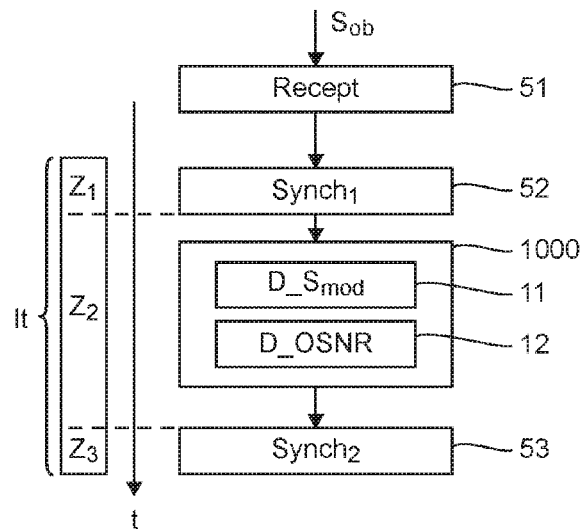
Figure 6:
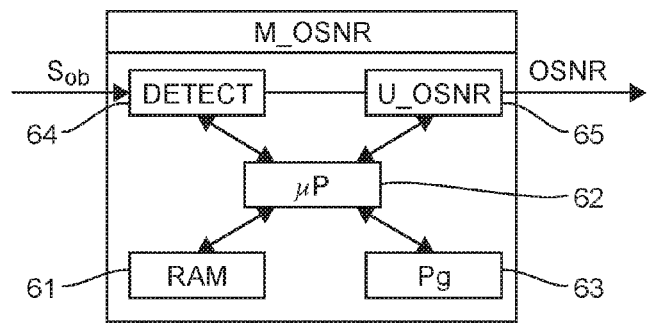
Figure 7:
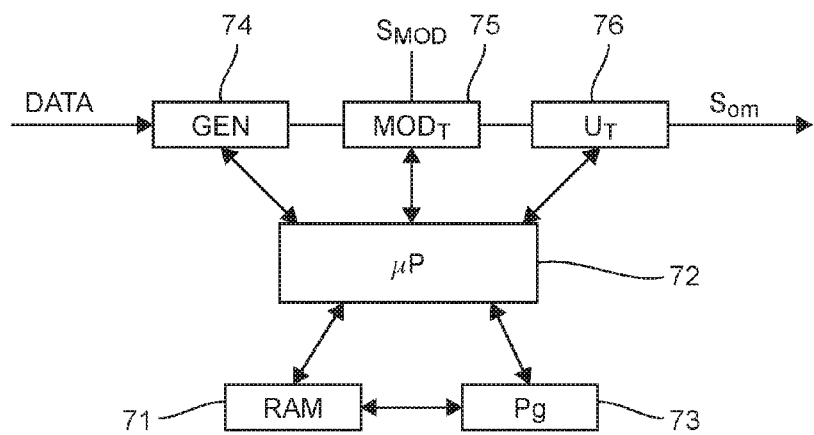
Figure 8:
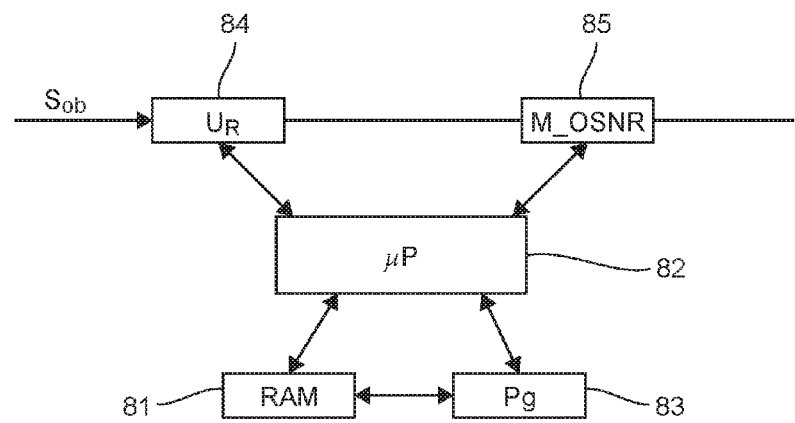
Figure 9:
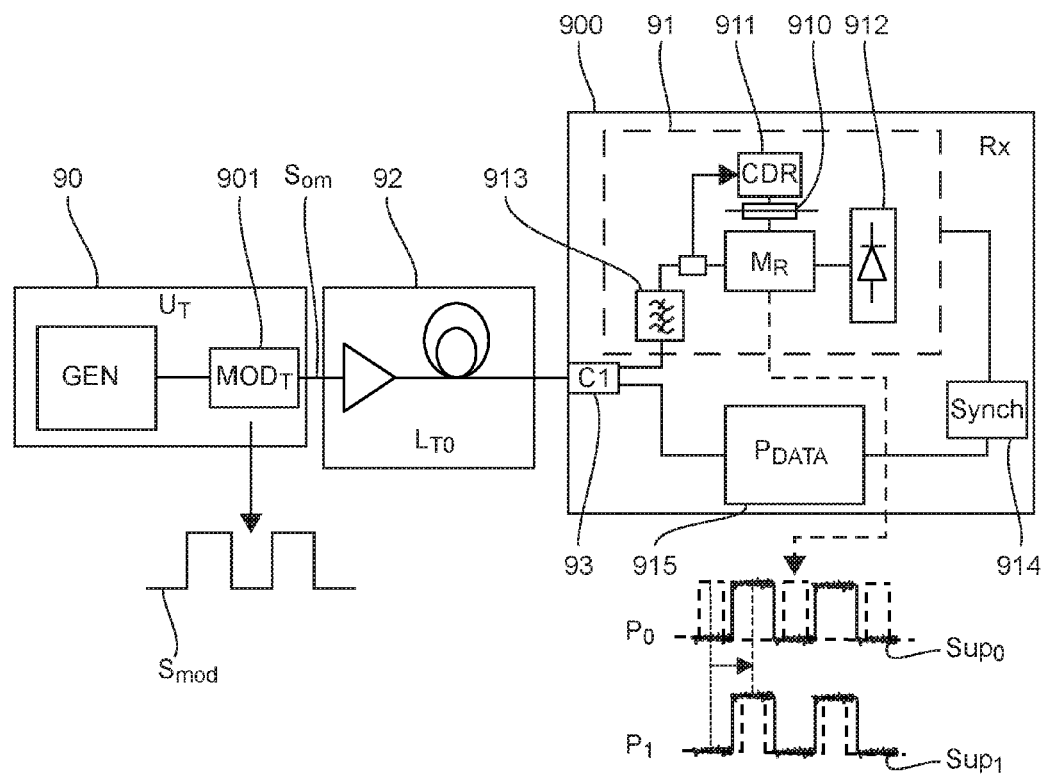

Other features and advantages of the proposed technique shall appear more clearly from the following description of a preferred embodiment, given by way of a simple illustratory and non-exhaustive example and from the appended drawings, of which:

FIG. 1 presents the main steps implemented by a method for determining an optical signal-to-noise ratio according to one embodiment of the invention;

FIG. 2 presents the steps implemented by the steps for determining an optical signal-to-noise ratio according to alternative embodiments of the invention;

FIG. 3 presents the main steps implemented by a method of transmission according to one embodiment of the invention;

FIG. 4 illustrates the structure of an optical signal obtained in implementing the steps of FIG. 3;

FIG. 5 presents the main steps implemented by a method of reception according to one embodiment of the invention;

FIGS. 6 to 8 respectively illustrate the simplified structure of a module for determining an optical signal-to-noise ratio, the simplified structure of a transmission device and the simplified structure of a reception device according to one particular embodiment of the invention; and FIG. 9 represents an optical system comprising a module for determining an optical signal-to-noise ratio, a transmission device and a reception device according to one particular embodiment of the invention.

5. DESCRIPTION OF ONE EMBODIMENT OF THE INVENTION

5.1 General Principle

The general principle of the invention relies on the implementing of a modulation signal, modulating an optical signal on at least one lower level of amplitude that is substantially zero and a higher level of amplitude. Such a modulation signal can be easily detected after transmission in an optical transmission line.

After detection, it is possible to carry out a power measurement of low complexity using this modulation signal, this modulation signal being affected with the same noise introduced during transmission in a channel as the optical signal that it modulates.

The technique according to the invention can be applied to the measurement of the optical signal-to-noise ratio in "in-band" mode. This averts the suspending of ongoing transmission on an optical channel, and averts the stopping of ongoing transmissions on channels that immediately neighbor the observed channel.

The technique according to the invention can also be applied to the measurement of the optical signal-to-noise ratio in off-band mode, this mode conventionally entailing fewer constraints in its implementation.

The invention can be applied especially in WDM optical transmission, especially for a dual-polarized WDM signals used in WDM transmission systems in service (which convey commercial data streams).

It also performs particularly well in the measurement of the OSNR of new-generation systems of WDM transmission at 100 Gbps using quadrature phase shift keying modulation with dual polarization.

However, the invention is not limited to dual-polarized optical signals and also offers an alternative to the techniques for measuring the optical signal-to-noise ratio of single-polarized signals.

Thus, the technique according to the invention is compatible with different types of polarization of optical signals. The modules implementing the technique according to the invention are therefore extremely interesting because of their capacity to deliver OSNR for different types of optical signals. Such modules therefore avert the purchasing of two distinct modules, one dedicated to single-polarized optical signals and the other to dual-polarized optical signals.

Here below, it must be noted that the details of implementation of the invention are presented with reference to an example based on a dual-polarized optical signal. However, the technique of the invention can be derived directly and without ambiguity for single-polarized optical signals or again any other type of multiple polarized optical signals.

5.2 Description of One Particular Embodiment of the Method for Determining an Optical Signal-to-Noise Ratio According to the Invention Here below, with reference to FIG. 1, are presented the main steps implemented by the method for determining an optical signal-to-noise ratio according to the invention.

Such a method (1000) for determining an optical signal-to-noise ratio comprises a step (11) for detecting $D\_S_{mod}$ (11) a modulation signal $S_{mod}$ in a dual-polarized optical signal $S_{ob}$, the modulation signal $S_{mod}$ modulating the dual-polarized optical signal on at least two levels of amplitude (a lower level of amplitude that is substantially zero and a higher level of amplitude distinct from the lower level of amplitude), and a step (12) for determining the optical signal-to-noise ratio from a measurement of power of said modulation signal.

The dual-polarized optical signal $S_{ob}$ is especially affected by optical transmission noise.

More specifically, according to one particular embodiment, the step (11) for detecting comprises a step for localizing local_lt (110) a time slot (lt) dedicated to the modulation, by the modulation signal $S_{mod}$, of the dual-polarized optical signal on least two levels of amplitude and a step (111) for detecting Det_F a frequency F of the modulation signal $S_{mod}$.

As illustrated in FIG. 2, the step 12 for determining the optical signal-to-noise ratio implements the following substeps:

generating G_Ref (121) a reference signal $S_{ref}$ that has at least one lower level of amplitude that is substantially zero and a higher level of amplitude, and has a frequency equal to the frequency F detected, temporally shifting $Dec_0$ (122) said reference signal relative to said modulation signal so that a higher level of amplitude of said reference signal is synchronized with a lower level of said modulation signal, delivering a lower reference signal, modulating $Mod_0$ (123) said modulation signal by means of said lower reference signal, delivering a first superimposed signal $S_{up0}$ associated with the lower level of said modulation signal, measuring the power $Mp_0$ (124) of said first superimposed signal $S_{up0}$, delivering a first power value $P_0$, temporally shifting $Dec_1$ (125) said reference signal relative to said modulation signal so that a higher level of amplitude of said reference signal is synchronized with a higher level of said modulation signal, delivering a higher reference signal, modulating $Mod_1$ (126) said modulation signal by means of said higher reference signal, delivering a second superimposed signal $S_{up1}$ associated with the higher level of said modulation signal, measuring power $Mp_1$ (127) of said second superimposed signal $S_{up1}$, delivering a second power value $P_1$, obtaining (128) said optical signal-to-noise ratio OSNR from said first and second power values $P_0$ and $P_1$.

FIG. 9 illustrates an example of implementation of an optical system according to the invention.

According to this example, the method for determining an optical signal-to-noise ratio OSNR is implemented by a module 91 for determining OSNR. According to this example of FIG. 9, the modulation signal $S_{mod}$ is an NRZ-OOK modulation signal that is perfectly periodic (01010101010 . . . ).

The step Det_F for detecting a frequency of the modulation signal $S_{mod}$ corresponds for example to a clock signal retrieval/generation CDR 911, the clock signal being also called a reference signal $S_{ref}$, the frequency of which is advantageously of the order of 1 MHz, the modulation signal having been selected so as to be robust with respect to the chromatic dispersion accumulated in the optical transmission line $L_{TO}$ (92). Such a module for detecting frequency and for generating clock signals CDR 911 inputs the optical signal $S_{ob}$ and outputs the clock signal also called $S_{ref}$. This signal is a radiofrequency signal devoid of any optical component.

The steps of temporal shifting $Dec_0$ and $Dec_1$ are carried out by a phase shifter 910 of the module for determining OSNR. Such a phase-shifter 910 is therefore positioned on the retrieved optical path.

After it is amplified and shifted, this reference signal $S_{ref}$ corresponding to a clock signal will be fed into a Mach-Zehnder (MZM) type modulator $M_R$ or an acousto-optical modulator (AOM), the response of which does not depend on the polarization of the incoming signals.

Through the phase-shifter 910, the periodic signal 01010101010 . . . retrieved at the receiver is successively synchronized with the "1s" and the "0s" of the NRZ-OOK signal $S_{mod}$ that have been generated at the emitter and that pass through the transmission line $L_{TO}$ (92).

Through a measurement of power ($Mp_0$, $Mp_1$), the power values $P_1$ and $P_0$ contained respectively in the "1s" and the "0s" of the NRZ-OOK signal generated at the transmitter are determined successively after this signal has been propagated on the transmission line and has been affected by the ASE noise.

The duty cycle $R_{CY}$ of the MZM/AOM modulator is optionally half as small as that used on the transmitter side.

Thus, when the duty cycle $R_{CY}$ is ½ (there are many "1s" as there are "0s" in the periodic data sequence 01010101010 . . . ), it will be equal to ¼ for the modulator of the OSNR determining module so much so that the duration of the "0s" is twice as long as the duration of the "1s".

The measurement of power ($Mp_0$, $Mp_1$) made by means of the power measuring device 912 delivering an average power value of the first and second superimposed signals $S_{up0}$ and $S_{up1}$, is made, according to the example of FIG. 9, on an arm of an optical coupler C1 93 intended for monitoring the optical signal (localized after passage into the optical transmission line). This measurement is therefore non-destructive for the commercial data stream carried for example by a measured WDM channel. It must finally be noted that the channel to be measured is selected by means of an optical filter 913 embedded in the OSNR determining module.

The power measured in the "1s" of the periodic sequence of the signal 01010101010 . . . integrates the power of the signal and that of the ASE noise while the power measured in the "0s" integrates only the power of the ASE noise accumulated in the transmission line $L_{TO}$ (92). Thus, once the power $P_1$ measured in the "1s" and the power $P_0$ measured in the "0s" have been obtained, the OSNR, for example in in-band mode, is obtained by the following relationship:

$$OSNR = \frac{P_S}{P_{ASE}} = \frac{P_1 - P_0}{P_0}$$

5.3 Description of One Particular Embodiment of the Method of Transmission According to the Invention Referring now to FIG. 3, we present the main steps implemented by the method of transmission according to the invention.

Such a method for transmitting a dual-polarized optical signal comprises a step (31) for generating G_So (31) the dual-polarized optical signal, the dual-polarized optical signal comprising at least one time slot It dedicated to a modulation, by a modulation signal $S_{mod}$, of the dual-polarized optical signal on at least one lower level of amplitude that is substantially zero and a higher level of amplitude.

In other words, a slightly "excess bit rate" is applied to an optical signal S which is to be subsequently measured. For example, 1 ms or 500 µs are reserved to form a dedicated time slot and this is done for example every 5 or 15 minutes.

Then, on the time slot It, a modulation (32) of the optical signal S by the modulation signal $S_{mod}$, is done and delivers a modified optical signal $S_{om}$, transmitted Tr (33) in the optical transmission line $L_{TO}$ (92).

As can be seen in FIG. 9, illustrating an example of implementation of an optical system according to the invention, the modulation signal $S_{mod}$ used by the transmission device 90 according to the invention is an NRZ-OOK modulation signal. Such a modulation signal $S_{mod}$ modulates or "over modulates" a dual-polarized optical signal S, for example a QPSK optical signal at 100 Gbps.

The modulator $MOD_T$ is for example of the Mach-Zehnder (MZM) type with a rate of extinction of 20 dB localized at the output of the emitter or preferably an acousto-optical modulator (AOM), the extinction rate of which can reach 100 dB.

Such a MZM/AOM modulator is for example integrated into a 100 Gbps WDM interface of a WDM transmission apparatus.

Preferably, this over modulation NRZ-OOK works at a very low frequency of the order of 1 MHz and is perfectly periodic (01010101010 . . . ).

The choice of the frequency depends on the chromatic dispersion accumulated in the optical transmission line $L_{TO}$ (92). A low frequency enables the periodic sequence of the modulation signal $S_{mod}$ (01010101010 . . . ) to be unaffected by the accumulated chromatic dispersion accumulated in the optical link to be measured by the determination of corresponding OSNR. A frequency of 1 MHz for example provides immunity to the chromatic dispersion in most examples.

5.4 Description of One Particular Embodiment of the Method of Reception According to the Invention Here below, referring to FIG. 5, we present the main steps implemented by the method of reception according to the invention. Such a method of reception comprises a step (51) for receiving a dual-polarized optical signal $S_{ob}$. This optical signal is especially affected by a noise from the optical transmission line used or from the optical channel of this optical transmission line.

In addition, the method of reception according to the invention comprises a step (1000) for determining an optical signal-to-noise ratio of said dual-polarization optical signal received according to the method for determining OSNR described here above.

More specifically, the method of reception according to the invention comprises a step for localizing a time slot It dedicated to a modulation, by a modulation signal, of said dual-polarized optical signal on at least one lower level having substantially zero amplitude and a higher level of amplitude.

This localizing step (not shown) is for example common with the method for determining OSNR described here above or is distinct from it.

In particular, as shown with reference to FIG. 4 illustrating the dual-polarized optical signal according to the invention, the time slot comprises at least three time zones ($Z_1$, $Z_2$, $Z_3$) that are successive and distinct.

With regard to these three distinct time zones, the method of reception comprises the following successive steps implemented by a reception device:
- on a first time zone ($Z_1$) of the time slot, first synchronization (52) of the reception device on a synchronization mode internal to said reception device,
- on a second time zone ($Z_2$) of the time slot, said steps for detecting and determining said optical signal-to-noise ratio,
- on a third time zone ($Z_3$) of the time slot, second synchronization (53) of the reception device in using a mode of synchronization associated with a part of payload data localized in said optical signal received after said time slot.

Referring to FIG. 9, illustrating an example of implementation of an optical system according to the invention, the reception device according to the invention therefore comprises a synchronization module 914 implementing the first and second steps of synchronization in order to temporally separate the determining of OSNR according to the invention from the processing $P_{DATA}$ 915 of the payload data.

5.5 Description of a Dual-Polarized Optical Signal According to the Invention

FIG. 4 illustrates the structure of an optical signal obtained by implementing the steps of FIG. 3.

More specifically, the dual-polarized optical signal comprises at least one time slot dedicated to a modulation, by a modulation signal, of said dual-polarized optical signal on at least one lower level having substantially zero amplitude and a higher level of amplitude.

According to one particular embodiment illustrated by FIG. 4, the time slot It comprises at least three successive and distinct time zones:
- a first time zone $Z_1$ (41) comprising a piece of information reporting the end of transmission of a part of payload data localized in said optical signal before said time slot, said first zone enabling a synchronization of a reception device on a mode of synchronization internal to said reception device,
- a second time zone $Z_2$ (42) on which said dual-polarized optical signal is modulated by a modulation signal on at least one lower level having a substantially zero amplitude and a higher level of amplitude,
- a third time zone $Z_3$ (43) comprising a piece of learning information used to change the mode of synchronization of said reception device in order to pass from said internal synchronization mode towards a mode of synchronization associated with a part of payload data located in said optical signal after said time slot.

For example, in the case of an optical transmission of a DP-QPSK transmission slot for transmission towards a DP-QPSK reception device, the structure of the signal corresponds to a multi-frame structure as represented in FIG. 4 and comprising a long square-wave or time slot of payload data containing data DATA with a duration of 5 or even 15 minutes followed by a short time slot It of 1 ms or 500 µs for example during a part of which the AOM/MZM modulator works and so on and so forth.

This short time slot consists of three zones:
- Zone 1 $Z_1$: comprising a warning signal so that the DP-QPSK reception device gets ready to receive the loss of optical signal due to the "0s" of the signal periodic sequence 01010101010 mentioned here above, when the modulation signal $S_{mod}$ is an NRZ-OOK modulation signal that is perfectly periodic (01010101010 . . . ) and the reception device remains nevertheless synchronized in the mode known as the "hold-over" mode in using for example an internal synchronization present in the DP-QPSK reception device,
- Zone 2 $Z_2$: comprising a modulation signal $S_{mod}$ used by the module for determining OSNR described here above, for example a pseudo-random binary sequence (PRBS) in the optical transport network (OTN) frames modulated in DP-QPSK and then over-modulated by the AOM/MZM modulator with the periodic sequence of the modulation signal $S_{mod}$ 01010101010 . . . ,
- Zone 3 $Z_3$: comprising a learning sequence in order to prepare the DP-QPSK reception device to get resynchronized on the next long time slot of payload bit rate and leave the "hold-over" synchronization mode towards the synchronization mode on a received signal.

A synchronization device Synch 914 as shown in FIG. 9 notably drives the module 91 for determining OSNR according to the invention and especially the AOM/MZM modulator so that it activates its operation only during the Zone 2 of the time slot It.

5.6 Description of the Module for Determining an Optical Signal-to-Noise Ratio and Transmission and Reception Devices According to the Invention Finally, referring to FIGS. 6 to 8 respectively, we present the simplified structure of a module for determining an optical signal-to-noise ratio implementing a method for determining an optical signal-to-noise ratio, the structure of a transmission device implementing a technique of transmission of an optical signal and the structure of a reception device implementing a technique of reception according to one particular embodiment of the invention.

As illustrated in FIG. 6, such a module for determining an optical signal-to-noise ratio M_OSNR for its part comprises a memory 61 comprising a buffer memory, a processing unit 62 equipped for example with a microprocessor µP, and driven by the computer program 63 implementing the method for determining an optical signal-to-noise ratio according to the invention.

At initialization, the code instructions of the computer program 63 are for example loaded into a RAM and then executed by the processor of the processing unit 62. The processing unit 62 inputs the optical signal $S_{ob}$. The microprocessor of the processing unit 62 implements the steps for determining an optical signal-to-noise ratio described here above according to the instructions of the computer program 63 to deliver the optical signal-to-noise ratio OSNR of the optical signal $S_{ob}$. To this end, the rendering device furthermore comprises: a detector DETECT 64, detecting in the optical signal $S_{ob}$, a modulation signal $S_{mod}$ modulating for example at least one lower level with a substantially zero amplitude and a higher level with amplitude, said optical signal, and a unit for determining U_OSNR 65 of the optical signal-to-noise ratio on the basis of a measurement of power of the modulation signal.

These modules are driven by the microprocessor of the processing unit 62.

As illustrated in FIG. 7, such a device for transmitting an optical signal comprises for its part a memory 71 comprising a buffer memory, a processing unit 72, equipped for example with a microprocessor µP, and driven by the computer program 73 implementing the method for transmitting an optical signal according to the invention.

At initialization, the code instructions of the computer program 73 are for example loaded into a RAM and then executed by the processor of the processing unit 72. The processing unit 72 inputs data DATA to be transmitted. The microprocessor of the processing unit 72 implements the steps of the method of transmission described here above according to the instructions of the computer program 73 to transmit an optical signal and enable the determining of its optical signal-to-noise ratio. To this end, the transmission device furthermore comprises: a generator GEN 74 of the optical signal, the optical signal comprising at least one time slot It dedicated to a modulation, by a modulation signal $S_{mod}$, of the optical signal on at least one lower level with substantially zero amplitude and a higher level with amplitude, a modulator $MOD_T$ 75 for modulating the optical signal by means of the modulation signal during said at least one time slot It and delivering a modified optical signal $S_{om}$, a transmission unit $U_T$ 76 for transmitting the modified optical signal in an optical transmission line.

These modules are driven by the microprocessor of the processing unit 72.

As illustrated in FIG. 8, such a reception device comprises a memory 81 comprising a buffer memory, a processing unit 82 equipped for example with a microprocessor µP and driven by the computer program 83 implementing the method for determining an optical signal-to-noise ratio according to the invention.

At initialization, the code instructions of the computer program 83 are for example loaded into a RAM and then executed by the processor of the processing unit 82. The processing unit 82 inputs data DATA to be transmitted. The microprocessor of the processing unit 72 implements the steps of the method of reception described here above according to the instructions of the computer program 83. To this end, the transmission device furthermore comprises: a reception unit $U_R$ 84 for receiving the optical signal $S_{ob}$, a module for determining an optical signal-to-noise ratio M_OSNR as shown in FIG. 6.

These modules are driven by the microprocessor of the processing unit 72.

The invention claimed is:

1. A method for determining an optical signal-to-noise ratio (OSNR) of a dual-polarized optical signal, wherein the method comprises the following acts performed by a processor of a transmitter device, a receiver device or a device for determining OSNR:
    detecting, in said dual-polarized optical signal, a modulation signal modulating said dual-polarized optical signal, on at least one lower level of amplitude that is substantially zero and a higher level of amplitude, wherein said act of detecting comprises localizing a time slot dedicated to a modulation on said levels of amplitude of the optical signal by said modulation signal; and
    determining said optical signal-to-noise ratio on the basis of a measurement of power of said modulation signal, wherein the acts of detecting said modulation signal and determining the optical signal-to-noise ratio are implemented on a median time zone, called a second time zone, of said time slot.

2. The method according to claim 1, wherein the act of detecting comprises detecting a frequency of said modulation signal and said act of determining said optical signal-to-noise ratio comprises the following acts:
    generating a reference signal, having at least one lower level of amplitude that is substantially zero and a higher level of amplitude, the frequency of this reference signal being equal to said detected frequency,
    temporally shifting said reference signal relative to said modulation signal so that the higher level of amplitude of said reference signal is synchronized with the lower level of said modulation signal, delivering a lower reference signal,
    modulating said modulation signal by means of said lower reference signal, delivering a first superimposed signal associated with a lower level of said modulation signal,
    measuring the power of said superimposed first signal delivering a first power value,
    temporally shifting said reference signal relative to said modulation signal so that the higher level of amplitude of said reference signal is synchronized with the higher level of said modulation signal, delivering a higher reference signal,
    modulating said modulation signal by means of said higher reference signal, delivering a second superimposed signal associated with the higher level of said modulation signal,
    measuring the power of said second superimposed signal, delivering a second power value,
    obtaining said optical signal-to-noise ratio from said first and second power values.

3. The method according to claim 2, wherein said acts of modulation implement a modification of a duty cycle of said reference signal so that it is half as small as that of the modulation signal.

4. The method according to claim 2, wherein said detected frequency of the modulation signal is of the order of 1 MHz.

5. A method for transmitting a dual-polarized optical signal, wherein the method comprises:
    generating said dual-polarized optical signal, said optical signal comprising at least one time slot dedicated to a modulation by a modulation signal, of said optical signal on at least one lower level of amplitude that is substantially zero and a higher level of amplitude, wherein said at least one time slot comprises at least three successive and distinct time zones:
        a first time zone comprising a piece of information reporting the end of transmission of a part of payload data localized in said optical signal before said time slot, said first zone enabling a synchronization of a reception device on a synchronization mode internal to said reception device,
        a second time zone on which said optical signal is modulated by a modulation signal on said levels of amplitude, and
        a third time zone comprising a piece of learning information enabling a change in mode of synchronization of said reception device in order to pass from said internal synchronization mode towards a mode of synchronization associated with a part of payload data localized in said optical signal after said time slot,
    modulating, on said second time zone of said at least one time slot, said dual-polarized optical signal by said modulation signal, delivering a modified optical signal, and transmitting said modified optical signal in an optical transmission line.

6. A method for receiving a dual-polarized optical signal wherein the method comprises the following acts:
receiving said dual-polarized optical signal, and
localizing a time slot dedicated to a modulation, by a modulation signal, of said dual-polarized optical signal on at least one lower level of amplitude that is substantially zero and a higher level of amplitude of said optical signal, said time slot comprising at least three successive and distinct time zones, and wherein said method for receiving comprises the following successive steps, implemented by a reception device:
on a first time zone of said time slot, first synchronization of said reception device on a mode of synchronization internal to said reception device,
on a second time zone of said time slot,
detecting, in said dual-polarized optical signal, said modulation signal modulating said dual-polarized optical signal, on said at least one lower level of amplitude that is substantially zero and said higher level of amplitude, and
determining said optical signal-to-noise ratio on the basis of a measurement of power of said modulation signal,
on a third time zone of said time slot, second synchronization of said reception device in using a mode of synchronization associated with a part of payload data localized in said optical signal received after said time slot.

7. A device for transmitting a dual-polarized optical signal, wherein the device comprises:
a generator of said dual-polarized optical signal, said dual-polarized optical signal comprising at least one time slot dedicated to a modulation, by a modulation signal, of said dual-polarized optical signal on at least one lower level of amplitude that is substantially zero and a higher level of amplitude, said at least one time slot comprises at least three successive and distinct time zones:
a first time zone comprising a piece of information reporting the end of transmission of a part of payload data localized in said optical signal before said time slot, said first zone enabling a synchronization of a reception device on a synchronization mode internal to said reception device,
a second time zone on which said optical signal is modulated by a modulation signal on said levels of amplitude,
a third time zone comprising a piece of learning information enabling a change in mode of synchronization of said reception device in order to pass from said internal synchronization mode towards a mode of synchronization associated with a part of payload data localized in said optical signal after said time slot,
a modulator configured for modulating, during said second time zone of said time slot, said optical signal by said modulation signal, delivering a modified optical signal,
a transmitter configured for transmitting said modified optical signal in an optical transmission line.

8. A device for receiving a dual-polarized optical signal, wherein the device comprises:
a receiver configured for receiving said dual-polarized optical signal,
a module, which is configured to determine an optical signal-to-noise ratio of said received dual-polarized optical signal and comprises:
a module configured for localizing a time slot dedicated to a modulation, by a modulation signal, of said dual-polarized optical signal on at least one lower level of amplitude that is substantially zero and a higher level of amplitude of said optical signal, said time slot comprising at least three successive and distinct time zones,
a module configured for performing a first synchronization of said reception device on a mode of synchronization internal to said reception device, on a first time zone of said time slot,
a detector, configured for detecting, in said dual-polarized optical signal, said modulation signal modulating said dual-polarized optical signal, on said at least one lower level of amplitude that is substantially zero and said higher level of amplitude, on a second time zone of said time slot, and
a unit, which is configured to determine, on said second time zone of said time slot, said optical signal-to-noise ratio on the basis of a measurement of power of said modulation signal, and
a module configured for performing a second synchronization, on a third time zone of said time slot, of said reception device using a mode of synchronization associated with a part of payload data localized in said optical signal received after said time slot.

* * * * *